United States Patent
Nitta et al.

(10) Patent No.: US 8,947,818 B2
(45) Date of Patent: Feb. 3, 2015

(54) DISK STORAGE APPARATUS AND DATA PROTECTION METHOD

(71) Applicant: Kabushiki Kaisha Toshiba, Tokyo (JP)

(72) Inventors: Tatsuo Nitta, Ome (JP); Takayuki Kawabe, Sagamihara (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 67 days.

(21) Appl. No.: 13/673,863

(22) Filed: Nov. 9, 2012

(65) Prior Publication Data

US 2014/0029126 A1    Jan. 30, 2014

(30) Foreign Application Priority Data

Jul. 25, 2012    (JP) .................................. 2012-164783

(51) Int. Cl.
G11B 19/04    (2006.01)
G11B 20/18    (2006.01)
G11B 20/10    (2006.01)

(52) U.S. Cl.
CPC ............. *G11B 19/044* (2013.01); *G11B 20/18* (2013.01); *G11B 2020/10898* (2013.01)
USPC ........................................................... 360/60

(58) Field of Classification Search
None
See application file for complete search history.

(56) References Cited

U.S. PATENT DOCUMENTS

| | | | |
|---|---|---|---|
| 6,781,780 B1 * | 8/2004 | Codilian ........................ 360/60 |
| 6,934,099 B2 * | 8/2005 | Oda et al. ........................ 360/27 |
| 7,206,990 B2 * | 4/2007 | Su et al. ......................... 714/769 |
| 7,215,497 B2 * | 5/2007 | Urata ............................... 360/53 |
| 7,423,828 B2 * | 9/2008 | Emo et al. ........................ 360/60 |
| 7,502,283 B2 * | 3/2009 | Schmidt et al. ............. 369/13.11 |
| 7,570,445 B2 * | 8/2009 | Alfred et al. ..................... 360/31 |
| 7,859,784 B2 * | 12/2010 | Ogawa ............................. 360/53 |
| 7,916,421 B1 * | 3/2011 | Liikanen et al. ............ 360/77.01 |
| 7,965,465 B2 * | 6/2011 | Sanvido et al. .................. 360/60 |
| 8,379,498 B2 * | 2/2013 | Mathew et al. .................. 360/69 |
| 8,587,889 B2 * | 11/2013 | Kawabe ........................... 360/60 |
| 8,593,748 B1 * | 11/2013 | Bandic et al. .................... 360/31 |
| 8,611,032 B2 * | 12/2013 | Champion et al. ............... 360/31 |
| 8,638,522 B2 * | 1/2014 | Matsuo et al. .............. 360/77.02 |
| 8,675,300 B2 * | 3/2014 | Matsuo et al. ............. 360/77.08 |
| 8,681,439 B2 * | 3/2014 | Mathew et al. .................. 360/31 |
| 8,699,163 B2 * | 4/2014 | Kashiwagi et al. ............. 360/50 |
| 2005/0141129 A1 * | 6/2005 | Schmidt et al. ............ 360/77.08 |
| 2009/0244754 A1 | 10/2009 | Sato |
| 2009/0244775 A1 | 10/2009 | Ehrlich |

(Continued)

FOREIGN PATENT DOCUMENTS

JP    3037250    4/2000
JP    2004-047023    2/2004

(Continued)

*Primary Examiner* — Wayne Young
*Assistant Examiner* — James L Habermehl
(74) *Attorney, Agent, or Firm* — Knobbe Martens Olson & Bear LLP (57) ABSTRACT

A disk storage apparatus according to one embodiment includes a head, a storage device, a write module and a controller. The head writes data on a disk. The storage device has a storage area for temporarily storing the data written by the head. The write module writes data to tracks on a disk, while partially overlapping the data with previously written data to adjacent track. The controller detects a drift-off write of the head while writing data, determines a drift-off write area in which the drift-off write is occurred, and protects the data written in the storage area, if the data is written in the drift-off write area.

18 Claims, 6 Drawing Sheets

(56) References Cited

U.S. PATENT DOCUMENTS

| | | |
|---|---|---|
| 2011/0292538 A1 | 12/2011 | Haga et al. |
| 2012/0063022 A1* | 3/2012 | Mathew et al. ................ 360/39 |
| 2012/0063023 A1* | 3/2012 | Mathew et al. ................ 360/53 |

FOREIGN PATENT DOCUMENTS

| | | |
|---|---|---|
| JP | 2009-238304 | 10/2009 |
| JP | 2009-245577 | 10/2009 |
| JP | 2011-253576 | 12/2011 |

* cited by examiner

F I G. 1 d1>PES　　　d2<PES　　　d2<PES
　　　　　(in forward direction)　(in reverse direction)

DISK STORAGE APPARATUS AND DATA PROTECTION METHOD

CROSS-REFERENCE TO RELATED APPLICATIONS

This application is based upon and claims the benefit of priority from Japanese Patent Application No. 2012-164783, filed Jul. 25, 2012, the entire contents of which are incorporated herein by reference.

FIELD

Embodiments described herein relate generally to a disk storage apparatus using a singled write, and a data protection method.

BACKGROUND

In recent years, a data writing technique known as "shingled write" or "shingled write magnetic recording (SMR)" has been developed as a technique achieving a high storage capacity, in disk storage apparatuses a representative example of which is the hard disk drive (HDD). Such a data writing method will be hereinafter referred to as "shingled write method."

The singled write method is a data writing method in which data is written in units of tracks provided on a disk, writing data in not only each track, but also partially overlapping the current track with previously written adjacent track. While data is being written in a track by the shingled write method, a phenomenon called "drift off write" may occur. That is, the head may deviate from the centerline of the track in which the data is being written. The term "drift off" is almost identical in sense to "track off."

If drift off write occurs during the shingled write, the data will be written in a track already holding other data. The other data may inevitably be degraded. If the other data is degraded, it may be subjected to a so-called "refresh process," also known as a "rewrite process." Once the data in the track has been erased, however, the refresh process can no longer be performed to read and save the data.

BRIEF DESCRIPTION OF THE DRAWINGS

FIGS. 5A, 5B, 50 and 5D are further diagrams explaining the data protecting process according to the embodiment;

DETAILED DESCRIPTION

In general, a disk storage apparatus according to one embodiment includes a head, a storage device, a write module and a controller. The head writes data on a disk. The storage device has a storage area for temporarily storing the data written by the head. The write module writes data to tracks on a disk, while partially overlapping the data with previously written data to adjacent track. The controller detects a drift-off write of the head while writing data, determines a drift-off write area in which the drift-off write is occurred, and protects the data written in the storage area, if the data is written in the drift-off write area.

Various embodiments will be described hereinafter with reference to the accompanying drawings.

[Configuration of the Disk Drive]

Figure 1:
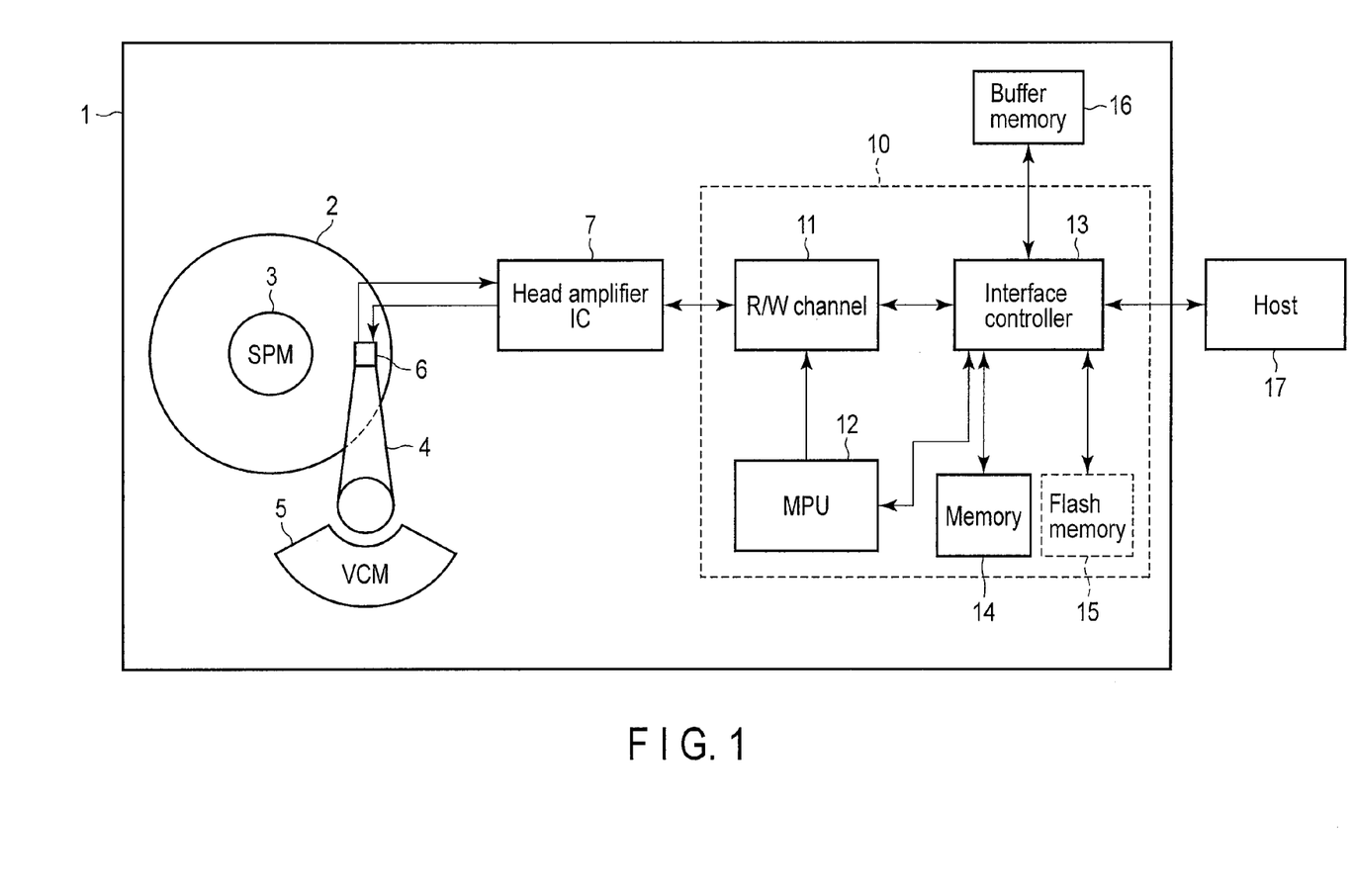
FIG. 1 is a block diagram showing the configuration of a disk storage apparatus according to one embodiment.

FIG. 1 is a block diagram showing the major components of a disk storage apparatus according to one embodiment. Hereinafter, a disk storage apparatus will be referred to as a "disk drive," as needed.

As shown in FIG. 1, the disk drive 1 comprises three major units, which are a head-disk assembly (HAD), a head-amplifier integrated circuit (hereinafter referred to as "head amplifier IC) 7, and a hard disk controller (HDC) 10.

The HAD has a disk 2, a spindle motor (SPM) 3, an arm 4, and a voice coil motor (VCM) 5. The disk 2 is a recording medium and may be rotated by the spindle motor 3. The spindle motor 2 rotates the disk 1. The arm 4 and VCM 5 constitute an actuator. If driven by the VCM 5, the arm 3 moves the head 6 mounted on it, to a designated position above the disk 2. The head 6 comprises a slider used as a main body, and a write head and a read head, both mounted on the slider. The read head is configured to read data (including servo data indispensable to positioning control) recorded in any data track provided on the disk 2. The write head is configured to write data on the disk 2. In the embodiment, the HDC 10 (hereinafter referred to as "controller," as needed) controls the write head, causing the same to write data on the disk 2 by means of shingled write.

The head amplifier IC 7 has a read amplifier and a write driver. The read amplifier amplifies a read signal read by the read head and transmits the read signal to a read/write (R/W) channel 11. The write driver transmits a write current based on the write data output from the R/W channel 11, to the write head.

The controller 10 is a one-chip integrated circuit comprising the R/W channel 11, a microprocessor (MPU) 12, an interface controller 13, and a memory 14. The memory 14 is composed of a random access memory (RAM) and a read only memory (ROM). The controller 10 may include a flash memory 15, which is a nonvolatile memory.

The R/W channel 11 includes a read channel and a write channel. The read channel processes read data. The write channel processes write data. The MPU 12 is the main controller in the disk drive, and performs the positioning control of the head 6, which is indispensable to the shingled write according to the embodiment, and also a data saving process during the drift-off write.

The interface controller 13 controls the data transfer between a host and the R/W channel 11. The interface controller 13 controls storing read data and write data temporarily to a buffer memory 16, thereby controlling the data transfer. The buffer memory 16 is a dynamic random access memory (DRAM).

[Write Control]

How a data protecting process is performed in the shingled write according to the embodiment, particularly in the event of a drift-off write, will be explained with reference to FIGS. 2A to 2C, FIGS. 3A to 3C, FIGS. 4A to 4D, FIGS. 5A to 5D, FIGS. 6A to 6C, FIGS. 7A to 7D, FIG. 8 and FIG. 9.

First, the disk drive 1, which uses the shingled write method, secures a nonvolatile cache area on the disk 2 in most cases. Alternatively, the nonvolatile cache area may be an area set in the flash memory 15.

On receiving data coming, along with a write command (i.e., write request), from the host 17, the controller 10 stores the data in the buffer memory 16. The data is then written from the buffer memory 16 in the nonvolatile cache area provided on the disk 2. If no commands have come from the host 17 for a prescribed time or a longer time, the controller 10 reads the data from the nonvolatile cache area and writes the data in the disk 2. In this case, the data is written in the user data area of the disk 2, by means of shingled write.

Figure 2A:
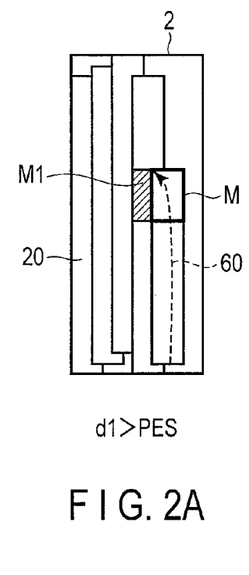
FIGS. 2A, 2B and 2C are diagrams explaining a data protecting process according to the embodiment.
Figure 2B:
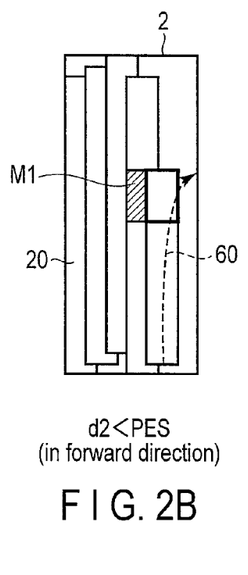
Figure 2C:
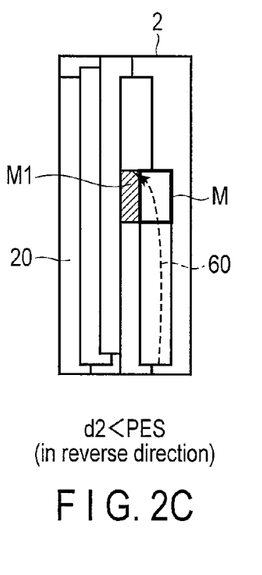

More specifically, as shown in FIG. 2A, the controller 10 writes the data at an address M (i.e., logical address) designated in the band area provided on the disk 2. The band area includes a plurality of tracks 20, which are units of shingled write. Assume that data M has been written at address M [nt, ns], where nt is the track number and ns is the sector number. In FIGS. 2A, 2B and 2C, "M1" is adjacent data written in an adjacent track provided in the same band area.

The data protecting process, which is performed in the event of a drift-off write, will be explained in detail with reference to the flowchart of FIG. 8.

To write the data M by means of shingled write, the MPU 12 of the controller 10 operates, causing the actuator to move the head 6 to a target position near the centerline of the track holding the data. In this case, the MPU 12 first acquires the value (hereafter referred to as "PES value) X of a position error signal (PES) representing the position error the head 6 has with respect to the position of the data M (Block 800). If the PES value X is zero, the head 6 (more precisely, the write head) is positioned at the target position, i.e., a position near the centerline of the track holding the data. The MPU 12 evaluates the PEX value X, determining that the head 6 has undergone a drift off.

To be more specific, the position 60 of the head 6 (hereinafter referred to as "head position") gradually deviates from the centerline of the track as shown in FIGS. 2A to 2C. This deviation is the drift-off. The MPU 12 uses two threshold values d1 and d2 stored in the memory 14 to determine how the data protecting process should be performed. Note that the threshold values d1 and d2 have the relation of: d1≤d2.

The MPU 12 compares the absolute value of PES with the threshold value d1 (Block 801). If the absolute value of PES is smaller than d1 (NO in Block 801), the MPU 12 determines that the drift off falls within a tolerable range. In this case, the controller 10 keeps making the head 6 perform the shingled write (Block 807). On the other hand, if the absolute value of PES is larger than d1 (YES in Block 801), the data is being written at a position off the centerline of the track. The MPU 12 therefore determines that the data M is degraded. If this is the case, the PEX value X is smaller than the threshold value d2 (NO in Block 802) as will be described later. The MPU 12 of the controller 10 therefore performs the positioning control of the head 6 again, and then causes the head 6 to write the data again along the centerline of the track (Block 806). The data M is thereby refreshed, which prevents the data from degrading in quality.

If the PES value X is larger than the threshold value d2 (YES in Block 802), the MPU 12 determines that a part of the data M may be written over the adjacent track to degrade the data written in the adjacent track. The minus sign put to the threshold value d2 means that the drift off has proceeded in the direction opposite to the direction of shingled write as shown in FIG. 2C.

As shown in FIG. 2B, the PES value X may indicate that the drift off has proceeded in the same direction as the shingled write as shown in FIG. 2B. In this case, the controller 10 causes the head 6 to rewrite the data M, without protecting the adjacent data (Block 806), even if the drift off has exceeded the threshold value d2 (NO in Block 802).

Assume that the drift off proceeds in the direction opposite to the direction of shingled write as shown in FIG. 2C and the PES value X exceeds the threshold value d2. Then, a part of the data M has been written over the adjacent data M1 in all probability. In this case (YES in Block 802), the MPU 12 protects the adjacent data M1 in the event of a drift off. Thus, the controller 10 causes the head 6 to write the data also in the track immediately preceding the track in which the data is being written. To achieve this data writing, the controller 10 has saved the data once written in the immediately preceding track, in the nonvolatile cache area provided on the disk 2 or in the buffer memory 16.

If the MPU 12 determines that the adjacent data M1 should be protected, it designates the address for the adjacent data M1 as [nt−1, ns] (Block 803). Note that nt−1 is the track number, and ns is the sector number. The adjacent data M1 is data L1 that is designated by logic address L1. The MPU 12 searches the nonvolatile cache area provided on the disk 2, determining whether the data L1 is stored in the nonvolatile cache area (Block 804).

Figures 3A, 3B:
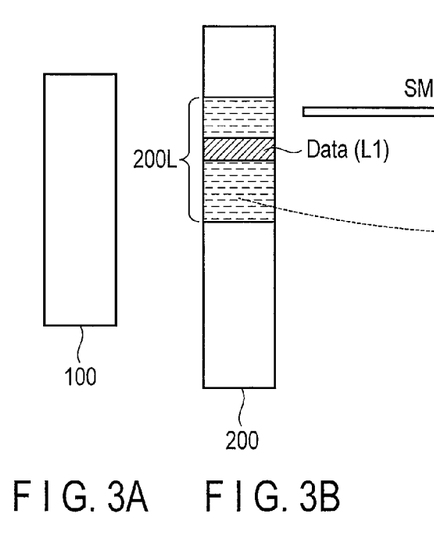
FIGS. 3A, 3B and 3C are other diagrams explaining the data protecting process according to the embodiment.

If the data L1 is stored in the nonvolatile cache area, the MPU 12 maintains the management data stored in the nonvolatile cache area, thereby protecting the adjacent data M1 in the nonvolatile cache area (Block 805). In other words, the MPU 12 does not delete the logic address L1 from the management table stored in the nonvolatile cache area, thereby maintaining the data L1 (i.e., adjacent data M1) in the nonvolatile cache area. More precisely, as shown in FIG. 3B, data 200L containing the data L1 corresponding to the adjacent data M1 is secured in the nonvolatile cache area.

Figure 3C:
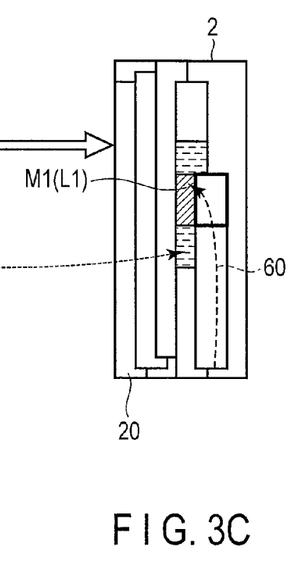

As shown in FIG. 3C, the controller 10 causes the head 6 to read the data 200L from the nonvolatile cache area 200, while merging the same. Thus, the data 200L can be written back in the band area on the disk 2, by means of shingled write (i.e., SMR flush). In this case, the data L1 is not stored in the buffer area 100 provided in the buffer memory 16, as shown in FIG. 3A.

If the data L1 is not stored in the nonvolatile cache area provided on the disk 2 (NO in Block 804), the MPU 10 determines whether the data L1 is stored in the buffer memory 16 (Block 808). If the data L1 is not stored in the buffer memory 16 (NO in Block 808), the controller 10 causes the head 6 to read the data L1 from a backup area that is a temporary data-save area provided on the disk 2 (Block 810).

Figure 4A:
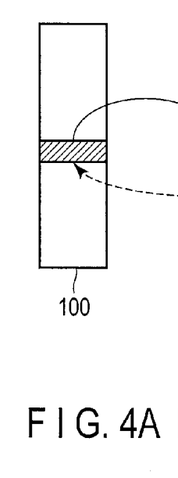
FIGS. 4A, 4B, 4C and 4D are still other diagrams explaining the data protecting process according to the embodiment.
Figure 4B:
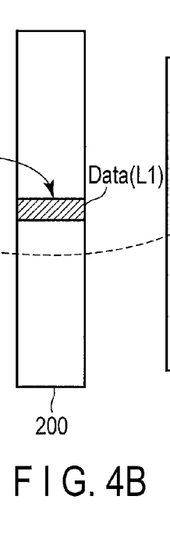
Figure 4C:
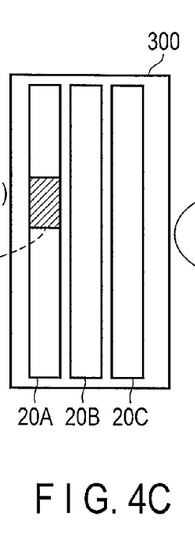
Figure 4D:
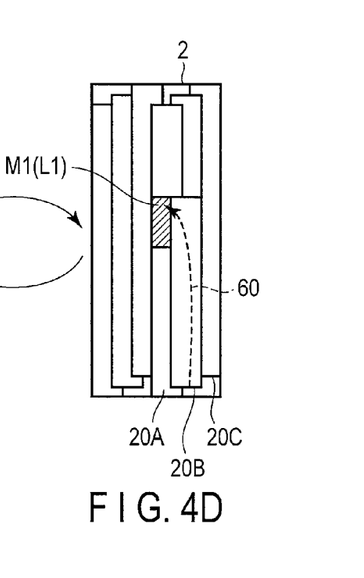

More specifically, the controller 10 causes the head 6 to read the data L1, as shown in FIG. 4C, from the track 20A provided in a backup area 300 provided on the disk 2. The controller 10 then stores the data L1 temporarily in the buffer area 100 provided in the buffer memory 16, as shown in FIGS. 4A and 4B. Further, the controller 10 transfers the data L1 from the buffer area 100 to the nonvolatile cache area 200 (Block 809). The data L1 corresponding to the adjacent data N1 can therefore be stored in the nonvolatile cache area 200. Thus, the data L1 can be protected. Note that the controller 10 sequentially transfers, by means of shingled write, the data of the tracks 20A to 20C (i.e., data stored in the buffer area 100) to the band area provided on the disk 2.

Figure 5A:
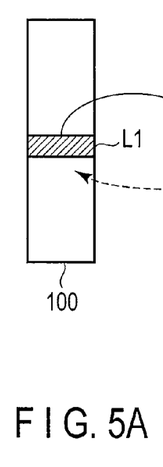
Figure 5B:
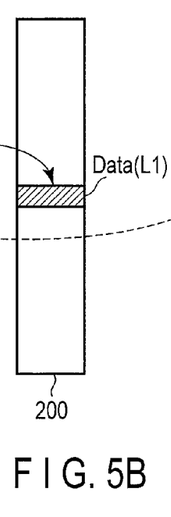
Figure 5C:
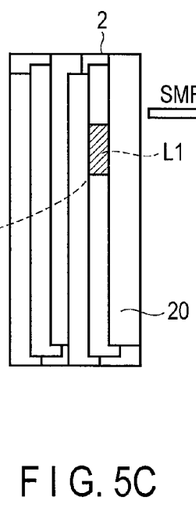
Figure 5D:
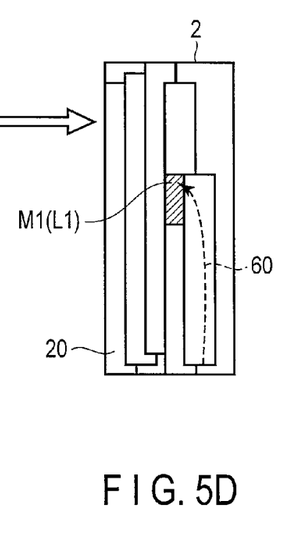

FIG. 5C is a diagram showing a case where the data L1 is stored in the band area provided on the disk 2. In this case, the controller 10 stores the data L1 read from the band area provided on the disk 2, temporarily in the buffer area 100, and then transfers the data L1 from the buffer area 100 to the nonvolatile cache area 200. The data L1 corresponding to the adjacent data M1 can therefore be protected in the nonvolatile cache area 200. The controller 10 can cause the head 6 to write the data written in any track, containing the data L1, from the band area to any target band area as shown in FIGS. 5C and 5D, by means of shingled write (SMR flush).

If the data L1 is stored in the buffer memory 16 (YES in Block 808), the controller 10 reads the data L1 from the buffer area of the buffer memory 16 and transfers the data L1 to the nonvolatile cache area 200 (Block 809). As a result, the data L1 corresponding to the adjacent data M1 can be protected in the nonvolatile cache area 200.

Figure 6A:
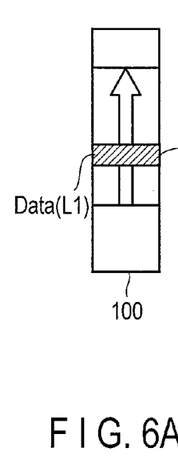
FIGS. 6A, 6B and 6C are still other diagrams explaining the data protecting process according to the embodiment.
Figure 6B:
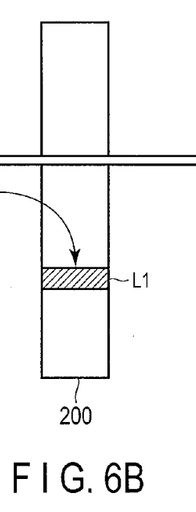
Figure 6C:
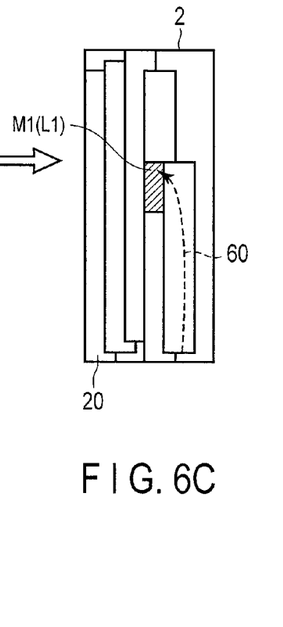

More precisely, the controller 10 reads the data L1 from the buffer area 100 provided in the buffer memory 16 and stores the data L1 in the nonvolatile cache area 200, as shown in FIG. 6A and FIG. 6B. Alternatively, as shown in FIG. 6A and FIG. 6C, the controller 10 may not store the data L1 in the nonvolatile cache area 200, but may cause the head 6 to write, by shingled write, the data L1 directly in the band area provided on the disk 2. That is, the controller 10 may perform a direct write (DW) to write the data from the host 17 directly to the band area of the disk 2 by shingled write, without using the nonvolatile cache area 200. In this case, to write the data transferred from the host 17 in a track provided on the disk 2 by shingled write, the controller 10 needs to hold, in the buffer area 100, the data in the immediately preceding track.

As has been described, the embodiment can protect the adjacent data, in consideration of the order in which tracks are subjected to shingled write. That is, if a drift-off write occurs during the shingled write in a track, the state of the data recorded in the adjacent track is evaluated from the direction and magnitude of the drift-off write (in comparison with the threshold values d1 and d2). If the state evaluated shows that the adjacent data has been written over by the drift-off write, the data L1 corresponding to the adjacent data M1 is saved in the buffer area 100 of the buffer memory 16, the nonvolatile cache area 200 or the backup area 300 provided on the disk 2. The data can thereby be protected, without using the data degraded by over writing. In other word, if a drift-off write takes place during the shingled write, the data recorded in the track can be reliably protected.

First Modified Embodiment

FIGS. 7A, 7B, 7C and 7D are diagrams explaining a first modified embodiment.

Figure 7A:
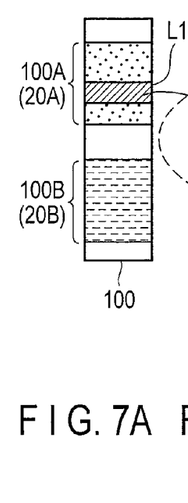
FIGS. 7A, 7B, 7C and 7D are diagrams explaining a first modified embodiment.
Figure 7B:
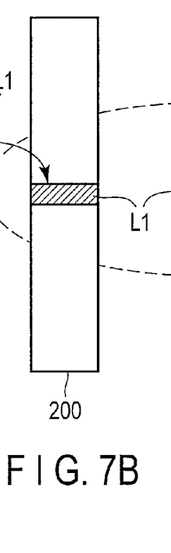
Figure 7C:
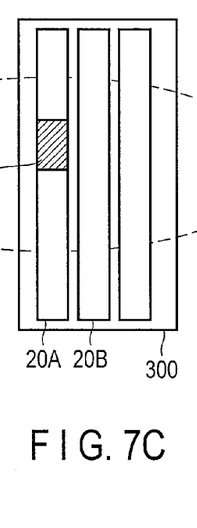
Figure 7D:
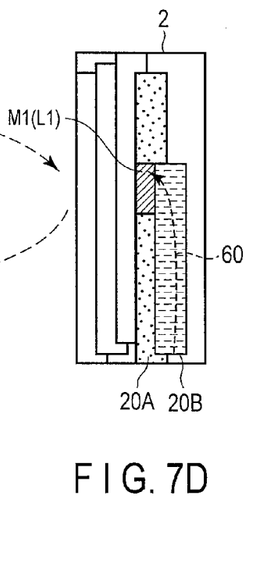

In this modified embodiment, the data recorded in the track 20A and containing the data L1 to be protected is stored in the backup area 300 of the disk 2, as shown in FIG. 7C. As shown in FIG. 7C and FIG. 7D, the controller 10 sequentially reads the data in the tracks 20A and 20B, which is stored in the buffer area 100, and transfers this data to the band area of the disk 2, by means of shingled write. In this case, while the data 100B in the track 20B is being written by means of shingled write, the data 100A in the track 20A immediately preceding the track 20B is held in the buffer area 100 of the buffer memory 16 as shown in FIG. 7A. The controller 10 reads the data L1, which should be protected, from the buffer area 100, and then stores the data L1 in the nonvolatile cache area 200 as shown in FIG. 7A and FIG. 7B. The data L1 corresponding to the adjacent data M1 can thereby be saved and, thus protected, in the nonvolatile cache area 200.

In the method according this embodiment, even if the data M1 undergoes drift-off write as shown in FIG. 7D, the controller 10 need not cause the head 6 to read the data L1 from the backup area 300 of the disk 2. A relatively long time elapses until the data L1 is stored in the nonvolatile cache area 200 via the buffer area 100 after it has been read from the backup area 300 of the disk 2. In view of this, the data 100A in the track 20A immediately preceding the track 20B is maintained in the buffer area 100 of the buffer memory 16 until the data 100B in the track 20B is completely written by means of shingled write. The data L1 to be protected can thereby be read from the buffer area 100 if a drift-off write occurs to the data M1. Hence, the data L1 can be protected at high speed.

Second Modified Embodiment

Figure 9:
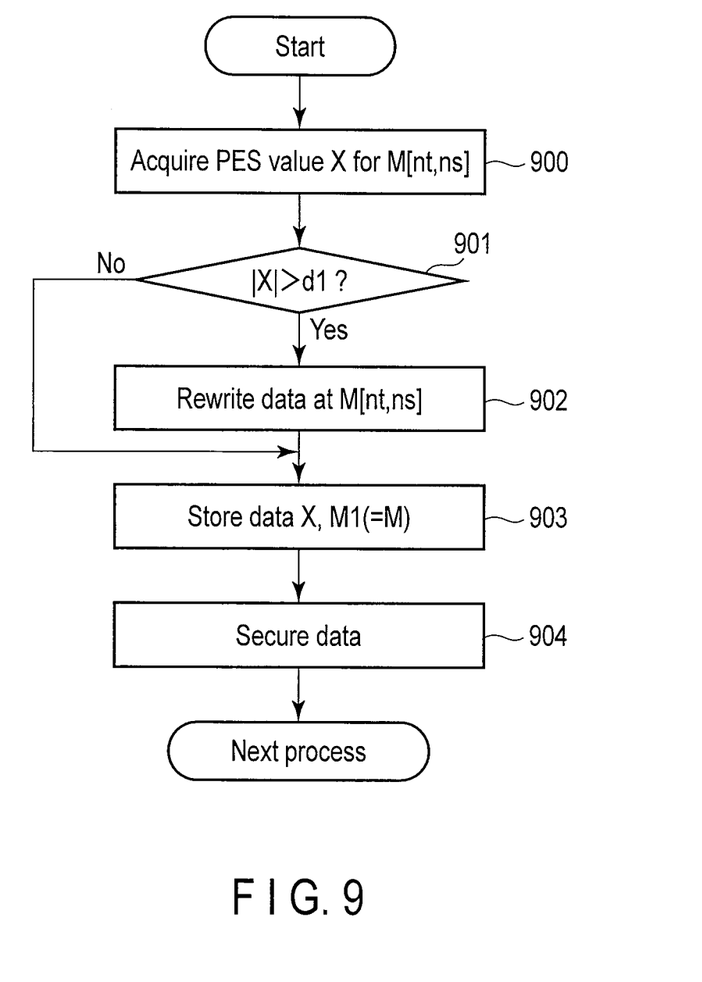
FIG. 9 is a flowchart explaining how a second modified embodiment operates.

FIG. 9 is a flowchart explaining how a second modified embodiment operates.

Figure 8:
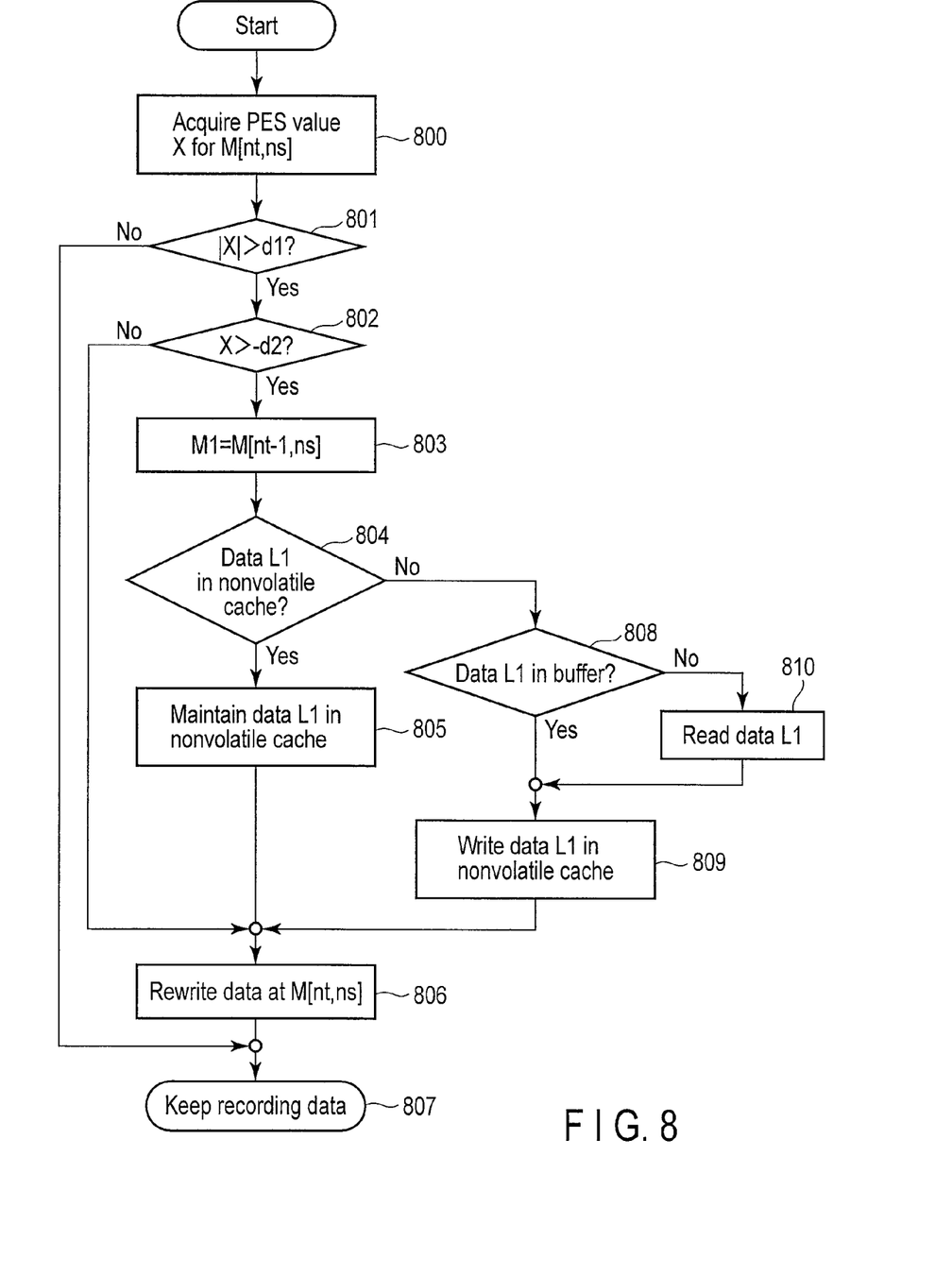
FIG. 8 is a flowchart explaining the data protecting process according to the embodiment.

In the second modified embodiment, a process of evaluating and rewriting the data being written and a process of evaluating and protecting the adjacent data are performed independently, in the data-protecting sequence shown in FIG. 8.

That is, FIG. 9 is a flowchart showing how the data being written is evaluated and rewritten. The adjacent data is evaluated and protected in the same way as in Blocks 802 to 810 shown in the flowchart of FIG. 8. Therefore, how the adjacent data is evaluated and protected in the second modified embodiment will not be explained.

As shown in FIG. 9, the MPU 12 first acquires the value PES value X representing the position error the head 6 has with respect to the position of the data M (Block 900). The MPU 12 then compares the absolute value of PES with the threshold value d1 (Block 901). If the absolute value of PES is larger than d1 (YES in Block 901), the MPU 12 rewrites the data M being written (Block 902). In this case, a retry process is repeated on the data M, until the head 6 reaches the end of the band area. If the absolute value of PES is smaller than d1 (NO in Block 901), the drift off falls within a tolerable range. In this case, the data M is not rewritten at all.

Next, the MPU 12 stores, in the memory 14, the PEX value S and the address M [nt−1, ns] of the data M1 adjacent to the data M being written (Block 903). If necessary, the MPU 12 further maintains the adjacent data M1 stored in, for example, the buffer area 100 of the buffer memory 16, or causes the head 6 to read data from the backup area 300 of the disk 2, thereby securing the adjacent data M1 (Block 904). If the absolute value of PES is smaller than d1, the MPU 12 may skip the processes of Blocks 903 and 904.

In this modified embodiment, the process of evaluating and rewriting the data being written and the process of evaluating and protecting the adjacent data are performed independently. This can increase the freedom of the process the controller 10 performs. Moreover, even if a plurality of adjacent data items must be protected, they can be written at a time in the nonvolatile cache area 200. This helps to reduce the overhead of the data protecting process.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A disk storage apparatus comprising:
a head configured to write data on a disk;
a storage device comprising a storage area for temporarily storing the data written by the head;
a write module configured to write data to tracks on a disk, while partially overlapping the data with previously written data to adjacent track; and
a controller,
wherein the controller detects a drift-off write of the head while writing data, determines a drift-off write area in which the drift-off write is occurred, and protects the data written in the storage area without rewriting the protected data in the drift-off write area, if the data is written in the drift-off write area.

2. The disk storage apparatus of claim 1, wherein the storage area is a nonvolatile cache area, and the controller performs a process of maintaining the data in the nonvolatile cache area for protecting.

3. The disk storage apparatus of claim 2, wherein the nonvolatile cache area is a storage area different from an area on the disk, in which data is written by the write module.

4. The disk storage apparatus of claim 1, wherein the storage area is a buffer area, and the controller performs a process of maintaining the data in the buffer area for protecting.

5. The disk storage apparatus of claim 4, wherein the controller writes the data maintained in the buffer area, in a nonvolatile cache area on the disk.

6. The disk storage apparatus of claim 1, wherein the controller performs a process of maintaining the data written in a backup area on the disk and used as the storage area, for protecting.

7. The disk storage apparatus of claim 6, wherein the controller writes the data maintained in the backup area, in a nonvolatile cache area on the disk.

8. The disk storage apparatus of claim 1, wherein if the drift-off write area is an area of the data written by the write module, the controller rewrites the data.

9. The disk storage apparatus of claim 1, wherein the controller acquires a position error value of the head during a write process by the write module, detects the drift-off write on the basis of the position error value and determines an area of the drift-off write.

10. A data protection method for use in a data storage apparatus in which a head performs a write process of writing data to tracks on a disk, while partially overlapping the data with previously written data to adjacent track, the method comprising:
detecting a drift-off write of the head while data being written;
determining a drift-off write area in which the drift-off write is occurred; and
protecting data in a storage area for temporarily storing data written in the write process without rewriting the protected data in the drift-off write area, if the data has been written in the drift-off write area.

11. The method of claim 10, wherein the protecting data is to maintain the data in a nonvolatile cache area used as the storage area.

12. The method of claim 11, wherein the nonvolatile cache area is a storage area different from an area on the disk, in which data is recorded by the write process.

13. The method of claim 10, wherein the protecting data is to maintain the data in a buffer area used as the storage area.

14. The method of claim 13, wherein the protecting data is to write the data maintained in the buffer area, in a nonvolatile cache area on the disk.

15. The method of claim 10, wherein the protecting data is to maintain the data in a backup area on the disk and used as the storage area.

16. The method of claim 15, wherein the protecting data is to write the data maintained in the backup area, in a nonvolatile cache area on the disk.

17. The method of claim 10, further comprising rewriting the data, if the drift-off write area is an area of the data written by the write process.

18. The method of claim 10, further comprising:
acquiring a position error value of the head during the write process; and
detecting the drift-off write on the basis of the position error value and determining an area of the drift-off write.

* * * * *